Jan. 7, 1964    F. HERZEGH ETAL    3,116,778
INFLATABLE EMERGENCY TIRE
Filed April 24, 1956    2 Sheets-Sheet 1
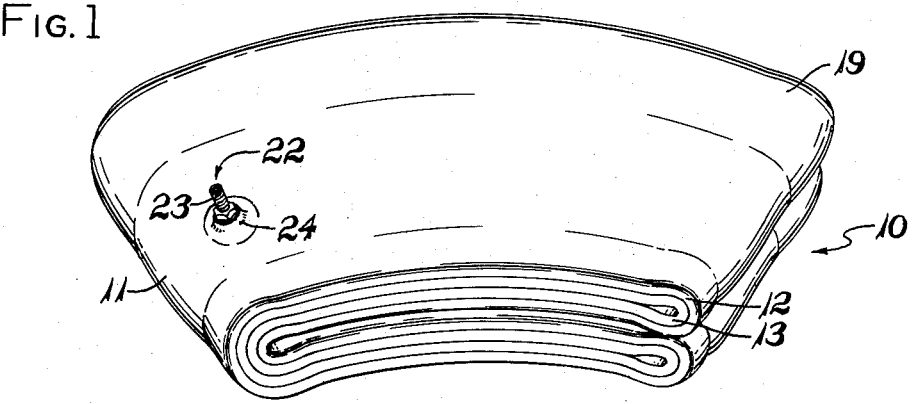
Fig. 1
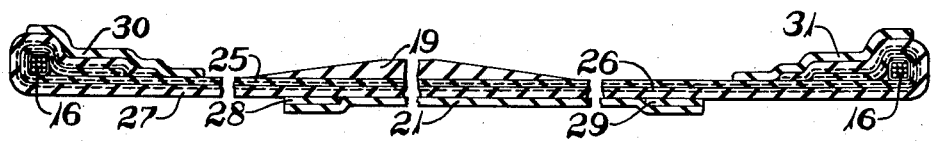
Fig. 3
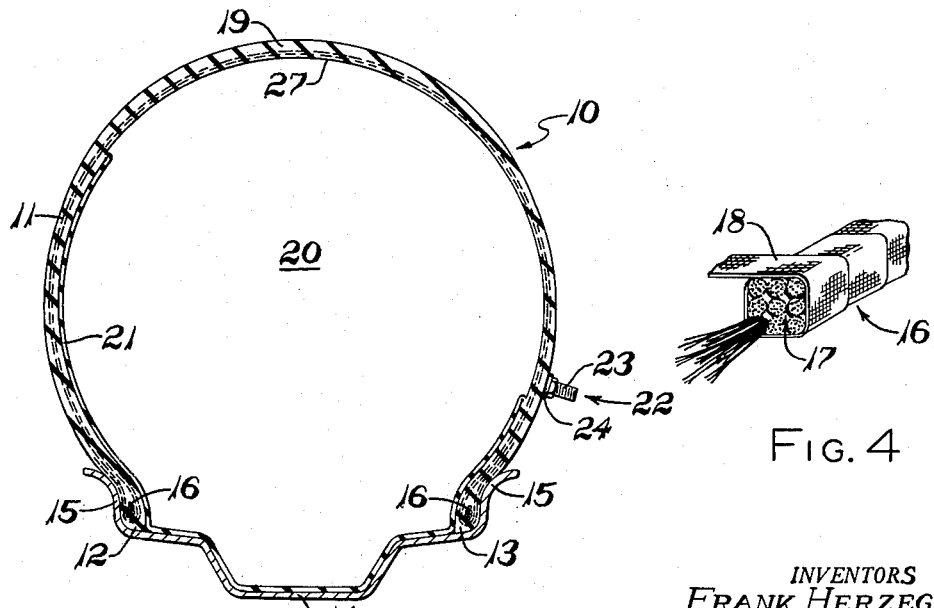
Fig. 2
Fig. 4
INVENTORS
FRANK HERZEGH
JAMES W. POND
BY
W. A. Shira, Jr.
ATTY.

United States Patent Office 3,116,778
Patented Jan. 7, 1964

3,116,778
INFLATABLE EMERGENCY TIRE
Frank Herzegh, Cleveland, and James W. Pond, Doylestown, Ohio, assignors to The B. F. Goodrich Company, New York, N.Y., a corporation of New York
Filed Apr. 24, 1956, Ser. No. 580,291
9 Claims. (Cl. 152—330)

This invention relates to inflatable vehicle tires and, more particularly, to tires of that type which are intended for emergency use.

Motor vehicles employing inflatable tires are conventionally provided with an extra or spare tire for use in the event one of the tires on which the vehicle travels should be punctured or otherwise injured. The customary practice is to have this extra or spare tire mounted on a wheel or rim which may be carried either internally or externally of the vehicle body. In the case of passenger vehicles, providing room for this extra or spare tire and wheel assembly within the body requires a very considerable amount of space which could be better used for other purposes. In addition, the provision of such storage space imposes limitations upon body styling. In an effort to offset these storage and design problems, some models of passenger vehicles have returned to the externally mounted spare tire of earlier years. This is not an entirely satisfactory solution to the problem since such externally mounted spare tires and wheels interfere with streamline flow of air over the vehicle body while the necessary mountings and protective covers increase the cost of the vehicle. Moreover, when the extra tire and wheel are mounted on the rear of the vehicle, the overall length of the latter is increased making it more difficult to park.

The aforementioned and other problems created by the practice of carrying an extra tire and wheel assembly that is interchangeable with those supporting the vehicle have led to proposals by vehicle body designers and others that such extra or spare tire and wheel assembly be eliminated. Such elimination is entirely feasible since modern inflatable tires have been improved to such an extent that reasonable attention to proper inflation, and replacement of the tires when worn, have made road failure of tires a rare occurrence. Moreover, the greater number of service stations and increased availability of road service no longer makes it necessary that the motorist himself be an expert in tire changing and repair. Nevertheless, motorist reaction to temporary elimination of the extra or spare tire and wheel during periods of shortage has indicated that the motoring public still desires to carry an extra tire for replacement of one of the four operating tires in the event of a tire failure while on the road even though the tire carried for such emergency replacement is not capable of use at the same speed and for the same length of time as the tires normally employed.

The principal object of this invention is, therefore, to provide an inflatable tire that may be safely used on a vehicle wheel in the event of emergency failure of a conventional tire, the emergency tire being so constructed that it may be collapsed or folded when not in use so that it occupies but a fraction of the space required for a conventional tire.

Another object of the invention is to provide an inflatable tire for motor vehicles of the passenger type characterized by having non-extensible flexible beads so that the tire may be folded without injury thereby facilitating storage and mounting.

A further object of the invention is to provide an inflatable tire having a self-contained inflation chamber and flexible beads such that the tire may be compactly stored by folding and yet is readily capable of emergency use in place of either a tubeless tire or a tire with a separate tube.

A more specific object of the invention is to provide an emergency inflatable tire comprising a flexible carcass of bias-laid ply fabric provided with a thin layer of tread stock on the running surface of the tire and having flexible non-extensible bead cores formed of a plurality of fine wires twisted together thereby permitting folding of the tire one or more times without injury to the tread, sidewalls or beads.

It is also an object of the invention to provide an emergency inflatable vehicle tire with flexible non-extensible beads and self-contained air chamber to which inflation fluid can be introduced through a valve in the sidewall of the tire whereby the tire may be stored in a small space when deflated and may be readily applied to a wheel rim previously equipped with a tubeless tire without removing the tubeless tire valve from the rim.

An additional object of the invention is to provide an inflatable emergency tire having a self-contained air chamber and a flexible carcass such that, when the tire is mounted on a wheel rim and is in deflated condition, it may be easily collapsed to a position in which the total diameter of the tire and wheel assembly is only a little greater than that of the wheel alone.

The invention further resides in certain novel features of the construction and arrangement of parts of a tire in which the invention is embodied, and further objects and advantages thereof will be apparent to those skilled in the art to which the invention pertains from the following description of the presently preferred embodiment and a modification thereof illustrated in the accompanying drawings, forming a part of this application, and in which:

FIG. 1 is a perspective view, to a reduced scale, of an emergency inflatable tire constructed in accordance with this invention, the tire being shown in deflatable folded condition;

FIG. 2 is a fragmentary transverse sectional view through an emergency tire of the type shown in FIG. 1, the tire being illustrated as mounted upon a conventional drop center wheel rim with the tire in inflated condition;

FIG. 3 is a fragmentary transverse sectional view through an emergency tire in the green or uncured state showing one way in which the tire may be constructed, portions of the tire intermediate the beads being broken away to permit the illustration on a larger scale than that employed for FIGS. 1 and 2;

FIG. 4 is an enlarged fragmentary perspective view of a bead core used in the tire of this invention, the core being shown as it appears prior to incorporation into the tire;

Figure 5:
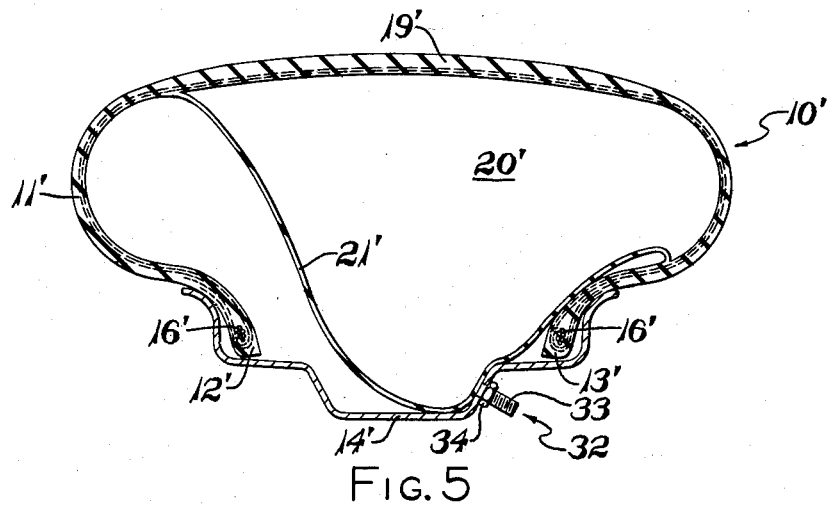
FIG. 5 is a fragmentary transverse sectional view through a modified construction showing an emergency tire embodying the principles of this invention mounted upon a vehicle wheel rim, the tire being illustrated as being substantially deflated.

An inflatable tire embodying the principles of this invention is of light weight construction and sufficiently flexible to permit folding, preferably into a double-folded condition as indicated in FIG. 1, when the tire is deflated. In this condition the tire requires little more space than an inner tube and does not require that the vehicle carrying it be provided with a body well and/or mounting means heretofore provided for spare tires and wheels. Consequently, the tire may be carried in the storage compartment of the vehicle without the necessity of having the height or other dimensions of this storage compartment limited by the dimensions of a conventional tire and wheel. Alternatively, the tire may be carried mounted on a vehicle wheel but with the tire in deflated condition so that the diameter of the assembly is less than that of a wheel provided with a conventional tire, the tire being readily collapsed by the application of light force thereto so that the total diameter of the assembly is substantially the same as that of the wheel alone.

Referring now to FIG. 2 of the drawing, it will be seen that the tire 10 of this invention comprises a thin wall carcass 11 formed of fabric reinforced elastomer, the carcass having axially spaced circumferentially extending beads 12 and 13 adapted to seat upon the bead seats of a conventional wheel rim 14 in engagement with the flanges 15 of the latter. The beads 12 and 13 are each provided with a bead core 16 which is circumferentially non-extensible as in conventional tires but differs from such conventional beads in being sufficiently laterally flexible to permit bending about a small radius and thus make possible the aforementioned folding of the tire when the latter is deflated. This flexibility is achieved by employing for the bead cores a plurality of strands of fine wire twisted together.

By way of specific example, bead cores of suitable flexibility are provided by employing a plurality of convolutions of wire cord each comprising a plurality of fine wires twisted together, the number of convolutions used to form the bead core being determined by the strength required to insure non-extensibility of the beads for a tire of given size and normal inflation pressure. The bead core 16, shown to a greatly enlarged scale in FIG. 4, comprises nine convolutions of such wire cord which has been dipped or otherwise provided with an elastomer 17 and preferably covered by a wrapping 18 of elastomer coated fabric. This wire cord is formed of brass-plated steel wire filaments, with three individual filaments twisted together to form a strand and seven strands twisted together to form the cord. The diameter of the individual wires is in the order of 0.0058 inch, and the resulting bead core, employing nine convolutions of such cord, is substantially square in cross section and measures in the order of 0.165 inch on a side, this dimension preferably not exceeding 0.20 inch. It will be appreciated that the dimensions and characteristics of the bead cores may be varied and that the invention is not limited to use of bead cores of these precise dimensions and characteristics.

In addition to flexibility of the bead cores, the tire 10 must possess a tread and sidewall construction of sufficient flexibility to permit the aforementioned folding of the tire. Therefore, the carcass 11 of the tire may employ as few as two plies of bias-laid cord fabric and the tread 19 of the tire may be formed by a comparatively thin piece of tread stock placed on the running surface of the tire and extending down the sidewalls of the carcass only far enough to protect the latter during cornering or turning. Since the tire is to be employed for emergency use only, the tread 19 need not have a thickness sufficient to provide the usual anti-skid tread pattern, and hence may be left in smooth condition, although it is within the purview of this invention to provide the tread with a shallow non-skid pattern. By way of example but with out limitation thereto, it may be mentioned that the thickness of the tire in the region of the tread 19 may be in the order of 0.25 inch which provides a sufficient quantity of material for safe operation through distances of at least five hundred miles.

The preferred embodiment of the emergency tire of this invention is intended to be capable of use in place of a tubeless tire without the necessity of removing from the rim the inflation valve normally employed for such tire. Also, the emergency tire may be used in place of a conventional tire employing a tube in which event the rim would not be air-tight upon removal of the tire and inner tube. In order to provide for each of these contingencies, the tire illustrated in FIGS. 1 to 3 includes a self-contained inflation chamber 20 which is inflatable through a valve that is located in the sidewall of the tire so that the valve does not need to be placed through the usual opening provided in the wheel rim. The self-contained inflation chamber of the tire is formed by employing a portion of the interior surface of the carcass 11 as a part of the wall of that chamber and a flexible annular sheet or layer 21 of elastomer, united to the wall of the carcass along the circumferential extending marginal or edge portions of the sheet, as the remainder of the wall of the chamber. The construction is such that, when the tire is mounted on a wheel rim and inflation fluid supplied to the inflation chamber 20, the annular sheet or layer 21 is deformed into the wheel rim in the manner shown in FIG. 2.

Inflation of the tire 10 is effected through a suitable valve means 22 communicating with the inflation chamber 20, this valve means being mounted in the sidewall of the tire intermediate one of the beads 12 or 13 and the running surface or tread portion 19 of the tire. Preferably, the valve means 22 is located radially inwardly of the region of maximum transverse diameter of the tire to eliminate or reduce the possibility of injury to the valve if the tire moves closely adjacent a stationary object. The valve means is located a sufficient distance radially outwardly from the tire bead so that the valve is above the rim flange 15 and cannot engage the latter upon turning or cornering of the wheel on which the tire is mounted. The valve means 22 may be of any suitable construction but is here shown as comprising a stem portion 23 provided with the usual valve core, not shown, the base of the stem being firmly secured to the sidewall of the carcass by any suitable construction. As here shown, the lower portion of the valve stem 23 is surrounded by, and united with the sidewall of the tire by a boss 24 of rubber molded to the sidewall but it will be apparent that other constructions may be employed.

An emergency tire embodying the principles of this invention may be constructed by utilizing bias-laid fabric reinforced sheets of elastomeric material of the type normally employed for builidng tire carcasses which material comprises parallel lying cords, either weftless or provided with weak weft cords, coated with elastomeric material. Preferably two such plies or layers 25, 26 (see FIG. 3) of reinforced elastomeric material are utilized with the reinforcing cords extending at an angle to each other and with the ply 26, which is to form the interior of the carcass preferably having an extra thickness or layer 27 of an elastomer calendered thereon to provide a substantially gas impervious surface on the interior of the carcass, it being remembered that a portion of this surface serves as a part of the wall for the inflation chamber 20 of the tire.

The interior surface of the ply 26 or of the layer 27, if the latter is used, is provided with the circumferentially extending or annular layer or sheet 21 of elastomer which is to form a part of the wall portion of the inflation chamber 20. The sheet or layer 21 must adhere to the layer 27 only along the circumferential edge or marginal portions of the sheet or layer 21 and hence it and/or the adjacent surface of the layer 27 must be of such composition or treated with suitable substances to secure this selected adhesion. This selective adherence can be effected by coating the surfaces which are not to be united with suitable preparations well known in the art. As here shown however, the selected adherence is achieved by forming the layer 27 of natural or GR–S rubber and the layer 21 of butyl rubber. These materials do not cross link or bond during cure so that the surfaces may be later separated when inflation fluid is supplied to the chamber 20. Union of the edge or marginal portions of the layer or sheet 21 to the layer 27 is achieved, when the aforementioned diverse elastomers are employed for the layers, by placing strips 28 and 29 of suitable tie gum or other adhesive promoting substances intermediate the said circumferentially extending edge or marginal portions of the sheet 21 and the adjacent surfaces of the layer 27. In the preferred embodiment, this tie gum comprises a composition containing brominated butyl elastomer which is compatible with and bonds to natural, GR-S and butyl rubbers so that the sheet or layer 21 is firmly united to the layer 27 in the areas where such tie gum is provided.

Assembly of the aforementioned layers 21, 25, 26 and 27 (the layer 27 being provided, when used, either as a separate element or calendered on the layer or ply 26, and the interposed tie gum strips 28 and 29, if used, being supplied with the layer 21 or as separate elements) may be effected upon a conventional tire building drum. The bead cores, such as 16, are next placed adjacent the circumferential edges of the resulting band and these edges are turned over the beads as indicated in FIG. 3 in a manner well known in tire building art. Preferably, strips 30 and 31 of rubber of the type normally employed for rim cushion stock are then provided over the turned edges of the ply stock, these strips having a width such that, in the completed tire, the edges of the strips extend somewhat above the flanges 15 of the wheel rim on which the tire will be used. The median region of the green carcass is next provided with a strip of tread stock 19, the width of which is such that the edges thereof extend only part way down the sidewalls of the completed tire so as not to unduly stiffen the latter. The resulting uncured or green tire may then be placed in a suitable tire forming and curing apparatus and subjected to the usual curing operations. The completed cured tire will be found to be sufficiently flexible so that it can be readily folded into a compact space or compartment without injury to the tread, sidewalls or beads.

An emergency tire, of the type heretofore illustrated and described, is employed by removing from the wheel rim the punctured or otherwise injured conventional tire and then mounting upon the rim the emergency tire 10, this being effected by unfolding the tire and placing the beads 12 and 13 over the wheel rim flange in the manner which is well known in mounting conventional tires. In view of the fact that the inflation valve for the emergency tire, shown in FIGS. 1 and 2, is in the tire sidewall, it is not necessary to remove from the rim the valve provided therein for a tubeless tire or, if the original tire had an inner tube, which is now removed, the resulting opening in the wheel rim need not be blocked. Inflation of the tire 10 may be effected by employing an air line, if available, a hand pump, or a cartridge of gas under pressure similar to that employed for charging seltzer bottles and which cartridges are now available for tire inflation purposes. The inflated tire 10 will then permit the vehicle thus equipped to proceed under its own power to a service station or other convenient place at which the conventional tire can be repaired and replaced upon the rim. When the conventional tire is again available the emergency tire may be readily removed after deflation and may then be stored in compact folded relationship for subsequent use as needed.

Figure 6:
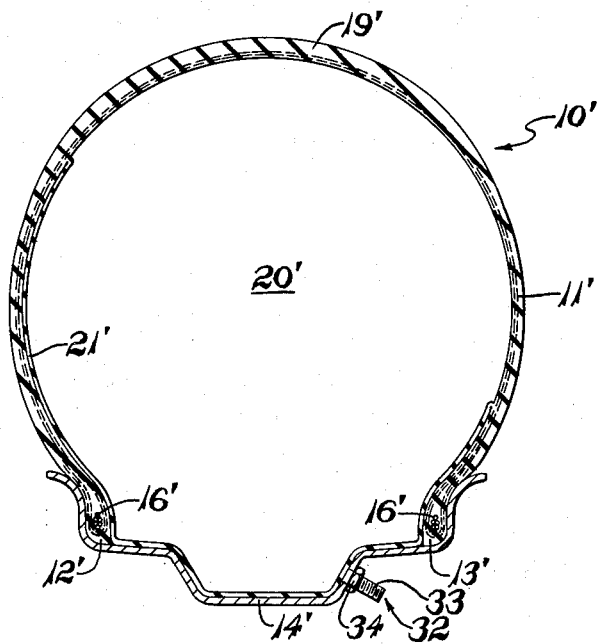
FIG. 6 is a view similar to FIG. 5 but showing the inflated position of the tire illustrated in FIG. 5.

In the event it is desired to avoid the difficulties of removing a conventional tire from the vehicle wheel rim before mounting the emergency tire 10 thereon, the emergency tire may be carried mounted upon a vehicle wheel but with the tire in deflated condition. This assembly occupies a considerably smaller space than the conventional tire and wheel assembly. When thus previously assembled upon a wheel, the emergency tire is used to replace a conventional tire by changing wheels, the emergency tire being inflated as above described before it is placed in use. With the emergency tire previously assembled upon its own wheel, the tire may have its inflation valve positioned to fit the conventional valve opening in the wheel rim. An emergency tire equipped with a valve so located is illustrated in FIGS. 5 and 6. This tire, aside from its valve, is made in the same manner and possesses the same characteristics as the tire illustrated in FIGS. 1 to 3 and hence like parts bear the same reference numerals but with a prime mark added.

As shown in FIG. 5, the modified tire 10' has a flexible carcass 11' provided with axially spaced beads 12' and 13' which have inextensible, flexible bead cores 16', the running surface of the tire being provided with a thin tread portion 19'. The tire 10' is shown in FIG. 5 as mounted on the rim 15' in substantially deflated condition so that the tire is in what may be termed a collapsed condition with the annular sheet or layer 21' which forms part of the inflation chamber 20' unexpended and with the tread portion of the tire disposed radially inwardly of its position when the tire is inflated. The tire may be further collapsed, if desired, by applying a light external force thereto so that the total diameter of the tire and wheel is substantially that of the wheel alone.

The tire 10' is shown as having a valve 32 secured to the annular sheet or layer 21' and passed through the usual valve opening in the wheel rim 14'. This valve may be of any suitable type but preferably is similar to that disclosed and claimed in the copending patent application of James W. Pond, Serial No. 583,350, filed April 23, 1956, which issued as Patent 2,942,642 on June 28, 1960. Such a valve comprises a metal base member which is molded in the elastomeric layer 21' during cure, the base member having a central threaded bore in which a valve stem 33 is threaded after the forming and curing of the tire is completed. The external surface of the valve stem 33 is threaded and is provided with a nut 34, after the stem has been passed through the valve opening of the wheel rim, to secure the valve in proper position even though the tire is deflated and collapsed to a greater extent than indicated in FIG. 5. Upon inflation of the tire 10' the several parts thereof will occupy the positions substantially as illustrated in FIG. 6. That is, the annular sheet or layer 21' will now be stretched to conform with the adjacent surface of the rim 14' and of the tire carcass while the latter is expanded so that the outside diameter thereof is substantially the same as that of the conventional tire which the emergency tire is to replace.

Emergency tires constructed as herein described have been road tested upon the wheels of conventional passenger vehicles and have performed satisfactorily for distances in excess of five hundred miles. In such tests the tires were mounted, run for a distance of one hundred miles, folded and placed in a carton, then remounted and run for another hundred mile interval, the entire procedure being repeated until the total distance run was five hundred miles. Such tests clearly demonstrated that folding and unfolding of the tire did not impair its utility.

The mode of constructing an emergency tire embodying the principles of this invention may vary with respect to the details thereof from the steps specifically illustrated and described as those which were used in preparing the presently preferred embodiment of the tire. Likewise, it will be evident that the materials employed may be varied in composition and/or dimensions from the specific examples given so long as the tire possesses sufficient flexibility to permit collapse and/or folding without injury to the tread, carcass or beads so that the tire may be stored in a compact relationship when mounted or unmounted and deflated and will properly seat upon the wheel rim and function satisfactorily when in use. In the event the emergency tire is to be carried mounted upon a wheel, only the carcass sidewalls and tread need be flexible and the bead cores can be of conventional type. In view of these and other modifications and adaptations which may be readily made by those skilled in the art, it will be apparent that the invention should not be considered as limited to the specific details of construction, materials or steps of procedure herein illustrated and described except as may be required by the spirit and scope of the appended claims.

Having thus described the invention, we claim:

1. An inflatable tire comprising a pair of spaced circumferentially extending flexible non-extensible bead cores, a flexible carcass including elastomer coated bias-laid ply fabric extending from bead core to bead core with the edges of the fabric turned around the cores, a thin layer of flexible tread stock united with said ply fabric on the external surface thereof, an annular sheet of elastomeric material disposed on the interior of the carcass with only the circumferentially extending marginal regions of the sheet united to the interior of the carcass and with the portion between said marginal regions free from said carcass to provide an inflatable chamber between the carcass and sheet conformable with a wheel rim on which the tire is mounted, and a valve mounted in a sidewall of said carcass and communicating with said chamber, the flexibility of said carcass, tread stock and bead cores being sufficient to permit folding the tire when the latter is deflated.

2. An inflatable tire as defined in claim 1 wherein the said bead cores each comprise a plurality of strands of fine wire twisted together.

3. An inflatable tire comprising a pair of spaced circumferentially extending bead cores each including flexible wire cords formed of a plurality of twisted wire filaments, a flexbile carcass including at least two annular layers of elastomer coated bias-laid ply fabric extending from bead core to bead core with the edges of the fabric turned around the cores, a thin layer of flexible tread stock disposed medially of said ply fabric and extending circumferentially on the external surface thereof with the circumferential edges of the tread stock terminating short of the bead cores, an annular sheet of elastomeric material disposed on the interior of the carcass with only the circumferentially extending marginal regions of the sheet united to the interior of the carcass and with the portion between said marginal regions free from said carcass to provide a single inflatable chamber for the entire tire between the carcass and sheet, and a valve mounted in a sidewall of said carcass and communicating with said chamber, the flexiblity of said carcass, tread stock and bead cores being sufficient to permit folding the tire when the latter is deflated.

4. An emergency tire for vehicles comprising a self-contained air-tight inflatable annulus provided with an inflation controlling valve, the said annulus being formed of cord reinforced elastomeric material provided with a thin flexible running surface of elastomeric material and axially spaced flexible wheel rim engaging bead portions each reinforced by a flexible non-extensible bead core formed of a plurality of strands of fine wire twisted together with the transverse dimension of each bead core not exceeding 0.20 inch, the flexibility of said reinforced elastomeric material, running surface and bead portions being sufficient to permit folding of the tire without injury thereto when the tire is deflated.

5. A tire as defined in claim 4 wherein the thickness of said carcass in the region of the tread stock is in the order of 0.25 inch.

6. An inflatable tire comprising a pair of spaced circumferentially extending flexible non-extensible bead cores, a flexible carcass including elastomer-coated bias-laid ply fabric extending from bead core to bead core witr the edges of the fabric turned around the cores, a thin layer of flexible tread stock united with said ply fabric on the external surface thereof, an annular sheet of elastomeric material disposed on the interior of the carcass with only the circumferentially extending marginal regions of the sheet united to the interior of the carcass and with the portion between said marginal regions free from said carcass to provide an inflatable chamber between the carcass and sheet with that part of the chamber formed by the sheet conformable with a wheel rim on which the tire is mounted, and an inflation controlling valve secured in a portion of the said tire and communicating with said chamber, the flexibility of said carcass, tread stock and bead cores being sufficient to permit folding of the tire when the latter is deflated.

7. A single chamber collapsible pneumatic tire having a casing including a pair of side walls, a bead at the radially inner edge of each of said side walls, an opening between said beads, a tread portion joining the radially outer edges of said side walls; a flexible diaphragm having its edges in sealed engagement with the inner surfaces of said side walls respectively; said diaphragm lying in flush contact with the inner surface of said casing for the full width of said diaphragm in the deflated condition of the tire; an inflation valve disposed in one of said side walls radially outwardly of the sealed engagement between said diaphragm and said one side wall; said diaphragm closing said opening and defining the radially inner portion of an air chamber having the general shape of a tire when pressurized air is admitted through said valve.

8. An inflatable tire comprising a pair of spaced circumferentially-extending, flexible, non-extensible bead cores, a flexible carcass including at least one fabric ply, tread material on the external surface of said fabric forming a tread portion, an annular sheet of elastomeric material disposed on the interior of the carcass with only the circumferentially-extending marginal regions of the sheet united to the interior of the carcass and with the portion between said marginal regions free from said carcass to provide an inflatable chamber between the carcass and the sheet with that part of the chamber formed by the sheet conformable with a wheel rim on which the tire may be mounted, and an inflation controlling valve secured in a portion of said tire and communicating with said chamber, the flexibility of said carcass, tread portion and bead cores being sufficient to permit folding of the tire when the latter is deflated.

9. An inflatable tire comprising a pair of spaced circumferentially extending non-extensible bead cores, a flexible carcass including at least one fabric ply, tread material on the external surface of said fabric forming a tread portion, an annular sheet of elastomeric material disposed on the interior of the carcass with only the circumferentially extending marginal regions of the sheet united to the interior of the carcass and with the portion between said marginal regions free from said carcass to provide an inflatable chamber between the carcass and the sheet with that part of the chamber formed by the sheet conformable with a wheel rim on which the tire may be mounted, and an inflation controlling valve secured in a portion of said tire and communicating with said chamber, the flexibility of said carcass and tread portion being sufficient to permit collapse of the tire when the latter is deflated to a configuration in which its diameter is in the order of the diameter of the flanges of the wheel rim on which it is adapted to be mounted.

References Cited in the file of this patent

UNITED STATES PATENTS

| 670,725 | Pickett | Mar. 26, 1901 |
|---|---|---|
| 768,278 | Hastings | Aug. 23, 1904 |
| 899,061 | Merriman | Sept. 22, 1908 |
| 1,619,812 | Develay | Mar. 8, 1927 |
| 1,875,390 | Musselman | Sept. 6, 1932 |
| 2,196,814 | McClay | Apr. 9, 1940 |
| 2,375,127 | Mendelsohn | May 1, 1945 |
| 2,537,632 | Mansfield et al. | Jan. 9, 1951 |
| 2,554,815 | Church | May 29, 1951 |
| 2,650,633 | Eger | Sept. 1, 1953 |
| 2,731,061 | Clark | Jan. 17, 1956 |

FOREIGN PATENTS

| 9,290 | Great Britain | of 1911 |